United States Patent [19]
Tahara

[11] Patent Number: 5,537,147
[45] Date of Patent: Jul. 16, 1996

[54] APPARATUS AND METHOD FOR INTRAFRAME AND INTERFRAME CODING A DIGITAL VIDEO SIGNAL

[75] Inventor: Katsumi Tahara, Kanagawa, Japan

[73] Assignee: Sony Corporation, Tokyo, Japan

[21] Appl. No.: 875,025

[22] Filed: Apr. 28, 1992

[30] Foreign Application Priority Data

May 9, 1991 [JP] Japan ................... 3-132114

[51] Int. Cl.⁶ .................. H04N 7/30; H04N 7/32
[52] U.S. Cl. ........................... 348/400; 348/401
[58] Field of Search ................... 358/136, 133, 358/135; 348/400, 401, 402, 408, 409, 410, 419, 420, 421; H04N 7/30, 7/32

[56] References Cited

U.S. PATENT DOCUMENTS

| | | | |
|---|---|---|---|
| 4,707,738 | 11/1987 | Ferre et al. | 348/400 |
| 4,757,383 | 7/1988 | Tanaka | 358/133 |
| 4,833,535 | 5/1989 | Ozeki et al. | 348/400 |
| 4,837,617 | 6/1989 | Brusewitz | 348/400 |
| 4,837,618 | 6/1989 | Hatori et al. | 348/401 |
| 4,999,704 | 3/1991 | Ando | 348/401 |
| 5,001,559 | 3/1991 | Gonzales et al. | 358/135 |
| 5,006,931 | 4/1991 | Shirota | 348/408 |
| 5,068,724 | 11/1991 | Krause et al. | 348/402 |
| 5,089,888 | 2/1992 | Zdepski et al. | 358/133 |
| 5,091,782 | 2/1992 | Krause et al. | 348/400 |
| 5,136,371 | 8/1992 | Savatier et al. | 348/409 |
| 5,150,432 | 9/1992 | Ueno et al. | 358/136 |

FOREIGN PATENT DOCUMENTS

0282135  9/1988  European Pat. Off. .

OTHER PUBLICATIONS

Signal Processing of HDTV 2,30 Aug. 1st Sep., 1989, L. Chiariglione (Ed.) 30 Aug. 1989, Amsterdam pp. 739–748 R. Kutka 'Block adaptive frame/field DCT coding decided by the vertical difference test' *abstract; FIG. 6*.

Primary Examiner—Tommy P. Chin
Assistant Examiner—Vu Le
Attorney, Agent, or Firm—William S. Frommer; Alvin Sinderbrand

[57] ABSTRACT

A coding apparatus and method for intraframe and interframe coding a digital video signal to produce intraframe coded data and interframe coded data, respectively. The intraframe and interframe coded data are both orthogonally transformed to produce transformed intraframe and interframe coded data. Either the transformed intraframe coded data or the transformed interframe coded data is selected in accordance with respective coefficient data of the intraframe and interframe coded data.

5 Claims, 7 Drawing Sheets

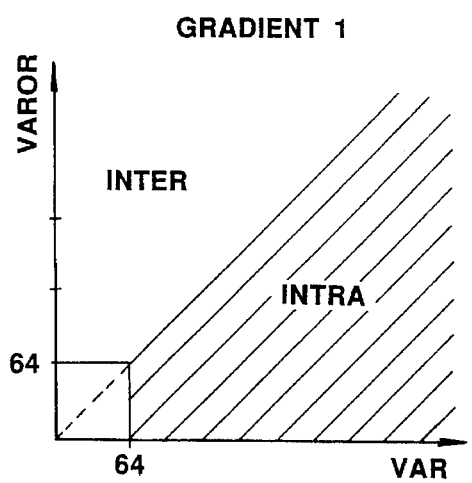
FIG. 7A NO MOTION COMPENSATION
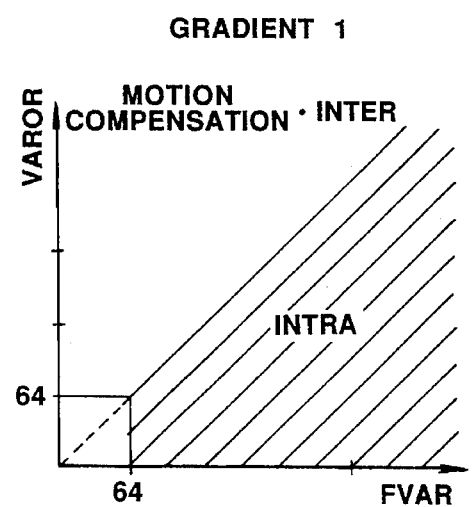
FIG. 7B MOTION COMPENSATION

APPARATUS AND METHOD FOR INTRAFRAME AND INTERFRAME CODING A DIGITAL VIDEO SIGNAL

BACKGROUND OF THE INVENTION

1. Field of the invention

This invention relates to a coding apparatus for a video signal, which is adapted to compress a video signal to transmit it.

2. Description of the Related Art

Heretofore, in the Japanese Laid Open Patent Application No. 1183/88 publication, in a television telephone system, or a conference telephone system, etc., there is proposed a video signal transmission system adapted for implementing efficient coding to a video signal comprised of a moving picture so that intraframe coded data or interframe coded data is provided to thereby transmit a moving picture video signal through a transmission path in which there is a relatively rigorous restriction for the transmission capacity. In this video transmission system, by making use of the fact that in the case where an attempt is made to transmit respective pictures PC1, PC2, PC3 ... each constituting a moving picture at time t=t1, t2, t3 ... as shown in FIG. 5(a), for example, a video signal is characterized in that it has high auto-correlation with respect to the lapse of time, such a processing is carried out to implement compression processing to picture or image data subject to transmission processing to thereby improve the transmission efficiency. As the compression processing of the picture data, there are an intraframe coding processing to compare respective pixel data within respective frames of respective pictures PC1, PC2, PC3 ... shown in FIG. 5(a) by making use of the auto-correlation between pixel data within the same frame to determine differences therebetween to thereby transmit compressed picture data, and an interframe coding processing to determine picture data PC12, PC23, ... shown in FIG. 5(b) comprised of differences of pixel data between pictures adjacent in succession like pictures PC1 and PC2, PC2 and PC3, ..., etc. shown in FIG. 5(a) to transmit them along with picture data subjected to intraframe coding processing with respect to the initial picture PC1 at the time t=t1.

Such a processing for coding a video signal is executed in a picture or image data generator of a structure as shown in FIG. 6, for example.

In FIG. 6, an input video signal VD is delivered to a pre-processing circuit 101. The pre-processing circuit 101 implements pre-processing, e.g., a half field dropping processing and a half field line thinning processing, etc., and the processed input video signal VD is delivered to an A/D converter 102. From the A/D converter 102, transmit unit block (this will be called a macro block hereinafter) data S120 comprised of data of 16 pixels (in a horizontal direction) ×16 pixels (in a vertical direction) constituting luminance signals and chroma signals is outputted. The macro block data S120 is delivered to a picture or image encoder 106 through a motion detecting unit 105 comprised of a motion detector 103 and a loop filter 104.

Here, it is efficient for those having high correlation in a time base direction of moving pictures to employ a method of encoding differences between respective frames. However, since in the case of a scene-change or a picture having sudden movement or motion, correlation between respective frames becomes lower, an employment of a method of encoding original pictures themselves permits the compression efficiency to be improved to more degree rather than the method of encoding differences. For this reason, the motion detecting unit 105 makes a comparison between data of the current or present frame delivered as the macro block data and predict earlier frame data S133 delivered through the loop filter 104 from a frame memory 116 which will be described later to detect a motion of picture. Then, compensation corresponding to the detected motion is implemented to the predict earlier frame data S133. The data thus obtained is delivered to the picture data encoder 106 as predict current frame data S122. It is to be noted that the loop filter 104 is applied in order to prevent inconveniences of display images or pictures, and is turned ON, e.g., when the above-mentioned motion compensation is carried out.

The picture data encoder 106 performs operations by the following equations (1) to (7) in accordance with the macro block data S120 and the predict current frame data S122 delivered thereto, $$\sum_{i=0}^{15} \sum_{j=0}^{15} (i, j) = MWOR \quad (1)$$

$$\sum_{i=0}^{15} \sum_{j=0}^{15} (A(i, j))^2 = VAROR1 \quad (2)$$

$$\sum_{i=0}^{15} \sum_{j=0}^{15} (A(i, j) - B(i, j, x, y))^2 = VAR1 \quad (3)$$

$$\sum_{i=0}^{15} \sum_{j=0}^{15} (A(i, j) - FB(i, j, x, y))^2 = FVAR1 \quad (4)$$

$$(VAROR1/256) - (MWOR/256)^2 = VAROR2 \quad (5)$$
$$(VAR1/256) = VAR2 \quad (6)$$
$$(FVAR1/256) = FVAR2 \quad (7)$$

Namely, when it is assumed that a pixel at (i, j) coordinates of a macro block of an original block is A(i, j), a pixel at (i, j) coordinates of a macro block earlier by one block in which a motion compensated motion vector (x, y) is taken into consideration is B(i, j, x, y), and a pixel when the loop filter 104 is applied to the pixel at (i, j) coordinates of the macro block earlier by one frame in which the motion compensated motion vector (x, y) is taken into consideration is FB(i, j, x, y), the picture data encoder 106 first carries out the operation indicated by the above equation (1) to calculate sum of all pixel data within the macro block subject to processing (hereinafter referred to as MWOR) thereafter to carry out the operation indicated by the above equation (2) to calculate sum of squares of all pixel data within the macro block (hereinafter referred to as VAROR1) thereafter to perform the operation indicated by the equation (3) to calculate square of a value (hereinafter referred to as VAR1) obtained by subtracting pixel data of the motion compensated earlier frame macro block from pixel data of a macro block of the current or present frame thereafter to perform the operation indicated by the above equation (4) to calculate square of a value (hereinafter referred to as FVAR1) obtained by subtracting data when the loop filter 104 is applied to pixel data of the motion compensated earlier frame macro block from pixel data of the macro block of the current frame. It is to be noted that in the case where there is no motion compensation in the above equations (3) and (4), x and y are both equal to zero.

Then, the picture data encoder 106 performs the operation indicated by the above equation (5) on the basis of four values MWOR, VAROR1, VAR1 and FVAR1 determined by the above operations to calculate a value (hereinafter referred to as VAROR2) obtained by subtracting a value obtained by dividing the MWOR by 256 from a value obtained by dividing the VAROR1 by 256 (in the case where data processing of the macro block is carried out by 8 bits, for example) to perform the operation indicated by the above equation (6) to calculate a value (hereinafter referred to as VAR2) obtained by dividing the VAR1 by 256, thereafter to perform the operation indicated by the above equation (7) to calculate a value (hereinafter referred to as FVAR2) obtained by dividing the FVAR1 by 256. In this processing, the VAROR2 represents a weight of the original picture, the VAR2 represents a weight of a predictive error when the loop filter 104 is not applied, and the FVAR2 represents a weight of a predictive error when the loop filter 104 is applied.

In the case where there is no motion compensation, the picture data encoder 106 to check up the value of the VAROR2 and the value of VAR2 with a graph as shown in FIG. 7(a) to output, when the result by checking falls within slanting lines, intra frame coded data (intra data) which is a difference between the macro block data S120 and reference value data, and to output, when the result by checking is outside the slanting lines, intra frame coded data (inter data) which is a difference between the predict current frame data S122 and the macro block data S120. On the other hand, in the case where there is motion compensation, the picture data encoder 106 checks the value of VAROR2 and the value of VAR2 with a graph as shown in FIG. 7(b), for example, to output, when the result by checking falls within slanting lines, that data as intra data, and to output, when the result by checking is outside the slanting lines, that data as inter data. It is to be noted that a threshold level is set in the picture data encoder 106, and that in the case where either the value of VAROR2 or the value of VAR2 or the both values is or are less than 64 as shown in FIGS. 7(a) and (b), the picture data encoder 106 outputs that data as inter data. Inter data or intra data outputted from the picture data encoder 106 is delivered to a transform encoder 107 as difference data S123.

The transform encoder 107 is constituted with a Discrete Cosine Transform circuit (so called DCT), and serves to orthogonally transform the difference data S123 delivered to thereby transform it to efficient coded data to deliver it as transformed coded data S124 to a transmit block setting circuit 108.

The transmit block setting circuit 108 is supplied with a threshold level of a predetermined level, for example. The transmit block setting circuit 108 determines a range of transmission from the transformed coded data S124 delivered thereto to deliver it as transmit block patterned data S125 to a quantizer 109.

The quantizer 109 is supplied with residual data S128 indicating residual of the current or present buffer area delivered from the transmit buffer memory 111. The quantizer 109 quantizes the transmit block patterned data S125 delivered at a quantization step corresponding to the residual data S128 delivered to deliver it as quantized picture data S126 to a retransform encoder 110 and an inverse quantizer 113.

The retransform encoder 110 is comprised of a Variable Length Coding Circuit or encoder (so called a VLC), etc. This retransform encoder 110 implements efficient coding processing to the quantized picture data S126 delivered to deliver it as transmit picture data S127 to the transmit buffer 111. It is to be noted that the retransform encoder 110 serves to drop all the quantized picture data S126 or a portion thereof to thereby carry out so called a frame dropping.

The transmit buffer memory 111 stores the transmit picture data S127 delivered. This stored transmit picture data S127 is read out at a predetermined transmission rate, and is delivered to a multiplexer 112. Further, the transmit buffer memory 111 delivers residual data indicating a residual of the memory area for storing the transmit picture data S127 to the quantizer 109 and the picture data encoder 106. When the quantizer 109 and the picture data encoder 106 knows or recognizes by the residual data delivered thereto that there has been no room in the memory area of the transmit buffer memory 111, they stop coding of picture data and quantization thereof, respectively. Thus, there results a frame dropped state, and an overflow, etc. in the transmit buffer memory 111 is prevented.

The multiplexer 112 synthesizes the transmit picture data S127 delivered from the transmit buffer memory 111 and audio data S129 delivered from an audio data generator 117 to send out this synthesized data to output a transmission path 118.

On the contrary, the inverse quantizer 113 implements inverse quantization to the quantized picture data S126 delivered from the quantizer 109 to deliver it as inverse quantized data S130 to an inverse transform encoder 114 (IDCT).

The inverse transform encoder 114 implements, to the inverse quantized data S130 delivered, an inverse orthogonal transform processing opposite to that of the transform encoder 107 so that inverse orthogonally transformed data is provided, thus to deliver it as inverse transformed coded data S131 to a decoder 115.

The decoder 115 decodes the inverse transformed coded data S131 delivered to thereby deliver, to a frame memory 116, it as coding difference data S132 indicating picture information outputted as the transmit picture data S127.

The predict earlier frame data stored up to that time in the frame memory 116 is subjected to modifying operation by the coding difference data S132 newly delivered. The frame memory 116 stores thereinto the data subjected to modifying operation as new predict earlier frame data S133.

The predict earlier frame data S133 stored into the frame memory 116 is read out by the motion detecting unit 105, and is subjected to motion compensation by the motion compensation circuit 103 as described above, resulting in predict current frame data S122. The frame data thus obtained is delivered to the picture data encoder 106. At times subsequent thereto, the above-described data processing is repeated.

Compressed and coded video data in this way is delivered to a decoding side (not shown) through the transmission path 118, and is reproduced by a decoding processing opposite to that of the above-described coding processing. Thus, e.g., an audio signal is delivered to a speaker, etc., and a video signal is delivered to a monitor device, etc.

However, the above-described coding apparatus for video signal is such that the picture data encoder 106 is adapted to calculate average or variance, etc. for pixels of the macro block by an extensive quantity of operations to discriminate, on the basis of these results of operations, whether video data should be outputted as inter data or should be outputted as intra data. For this reason, it takes much time in carrying out such extensive quantity of operations, and a large number of operational circuits, etc. are required. As a result, the scale of this coding apparatus for video signal itself became large.

Further, the above-mentioned coding apparatus for video signal has to effect a control so as to stop both the picture data encoder 106 and the quantizer 109 in dependency upon a residual of the memory area of the transmit buffer memory 111 in order to prevent an overflow, etc. in the transmit buffer memory 111. For this reason, control points for preventing such overflow, etc. are dispersed, so control becomes complicated. In addition, controls of respective circuits become uncertain.

OBJECT AND SUMMARY OF THE INVENTION

With the above-described problems in view, this invention has been proposed, and its object is to provide a coding apparatus for a video signal, which can reduce a quantity of operations for discriminating whether video data should be outputted as inter data or should be outputted as intra data, which can reduce the cost, and which is adapted to concentrate control points for prevention of overflow, etc., thus making possible to carry out a secure control.

This invention comprises intraframe coding means for implementing intraframe coding to a digital video signal to be transmitted to output it, interframe coding means for implementing interframe coding to a digital video signal to be transmitted to output it, first orthogonal transform means for orthogonal tansforming intraframe coded data from the intraframe coding means, second orthogonal transform means for orthogonally tansforming interframe coded data from the interframe coding means, and selector means for selecting the intraframe coded data or the interframe coded data on the basis of coefficient data from the first and second orthogonal transform means to output a selected one.

In accordance with this coding apparatus for a video signal according to this invention, the first orthogonal transform means orthogonally transforms interframe coded data obtained by implementing interframe coding to a video signal to be transmitted, and the second orthogonal transform means orthogonally transforms intraframe coded data obtained by implementing intra frame coding to a digital video signal to be transmitted. Thereafter, the selector means selects the interframe coded data or the intraframe coded data on the basis of coefficient data delivered from the respective orthogonal transform means to output a selected one.

BRIEF DESCRIPTION OF THE DRAWINGS

FIG. 7 is a model view for explaining inter/intra discrimination of the conventional video signal coding apparatus.

DETAILED DESCRIPTION PREFERRED EMBODIMENT

An embodiment of a coding apparatus for a video signal according to this invention will now be described with reference to the attached drawings.

Figure 1:
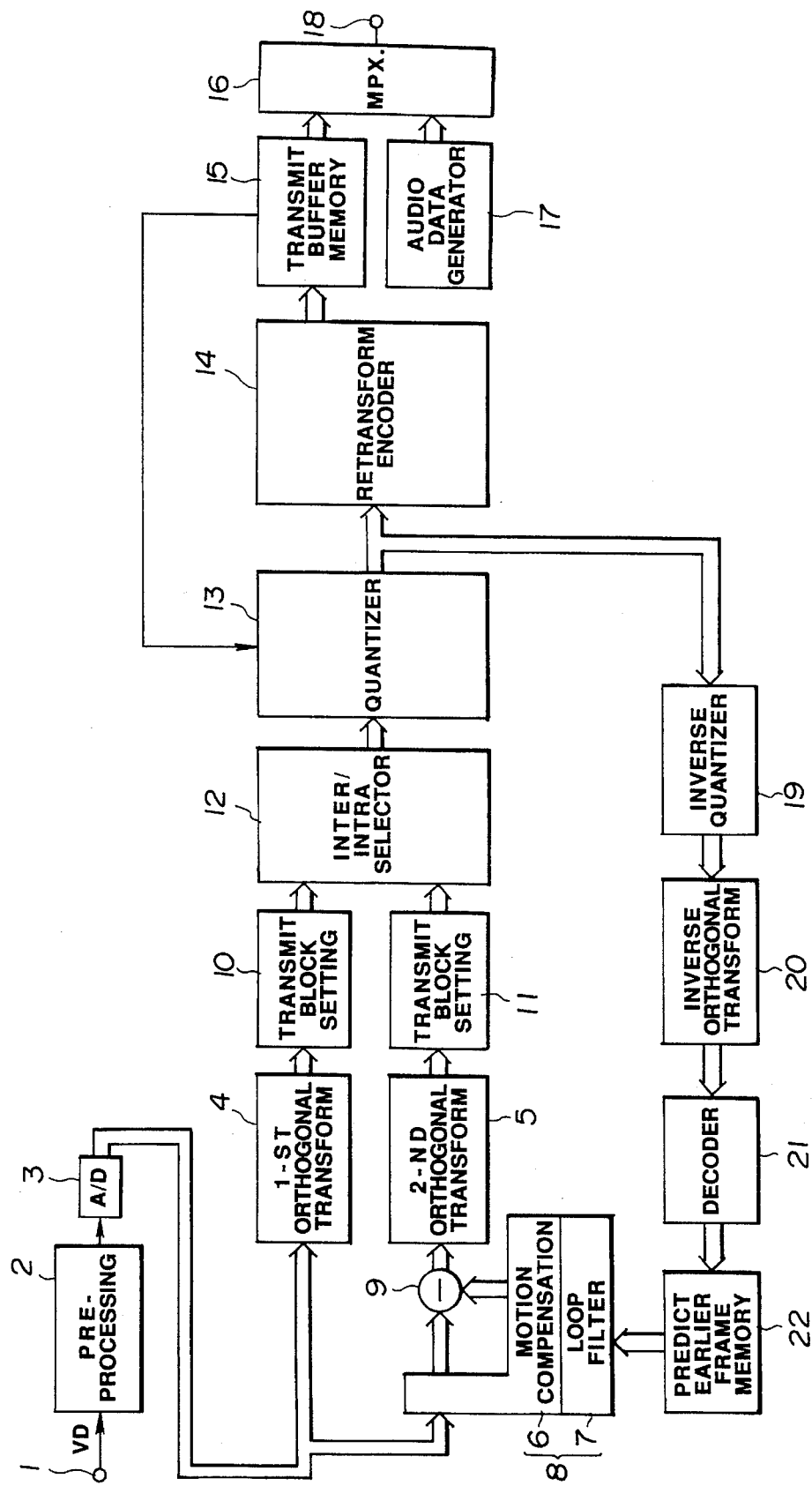
FIG. 1 is a functional block diagram of a coding apparatus for a video signal according to this invention.

The coding apparatus for video signal according to this invention has a configuration as shown in FIG. 1.

The coding apparatus for video signal shown in FIG. 1 is adapted so that an analog input video signal VD from an imaging section of a television telephone, for example, is delivered to a pre-processing circuit 2 through an input terminal 1.

The pre-processing circuit 2 implements, to the analog input video signal delivered thereto, a pre-processing such as a half field dropping processing or a half field line thinning processing, etc., thus to deliver such pre-processed signal to an A/D converter 3.

The A/D converter 3 samples the analog input video signal VD delivered every one frame at a predetermined frequency to digitize it. From this A/D converter 3, video data every macro block which will be described later is outputted.

Figure 2:
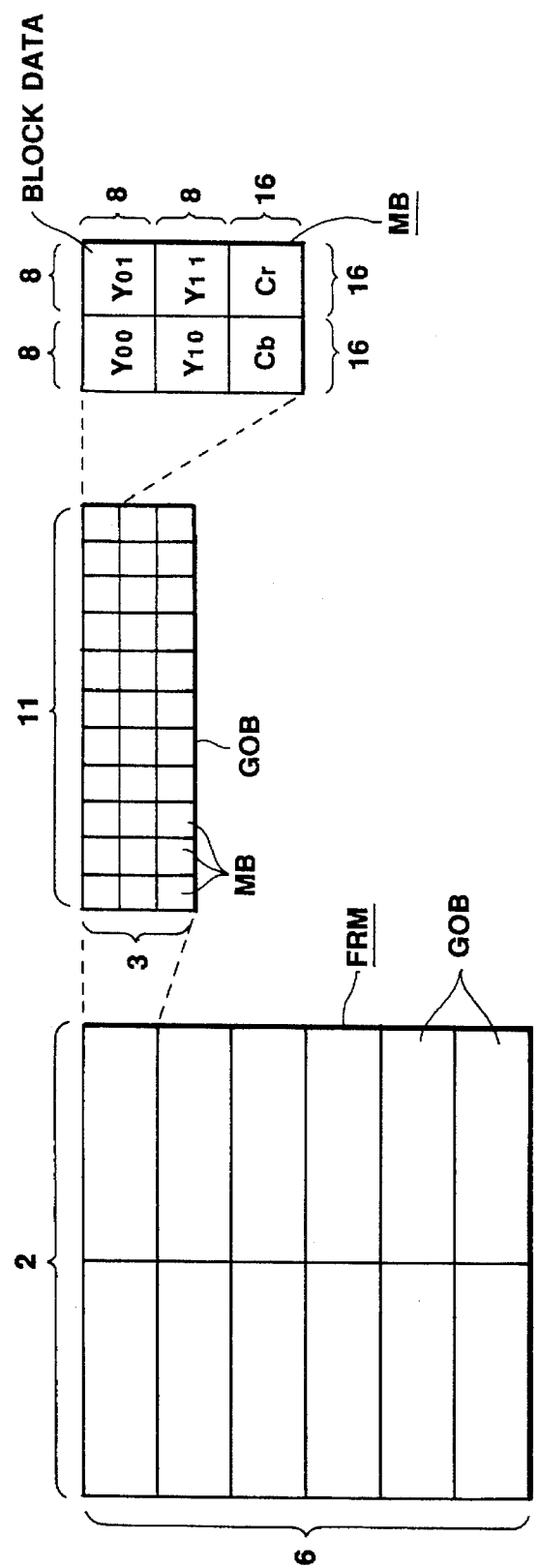
FIG. 2 is a model view for explaining the manner of generating a macro block.

Namely, in order to generate video data every macro block, the video data of one frame is divided into a group of blocks GOB of 2 (in a horizontal direction)×6 (in a vertical direction) blocks as shown in FIG. 2(a). Then, each block of the group of blocks GOB is divided into macro blocks of 11 (in a horizontal direction)×3 (in a vertical direction) blocks as shown in FIG. 2(b). Thus, it is possible to output video data every macro block (hereinafter referred to as macro block data). It is to be noted that each macro block is composed of luminance data Y00~Y11 of 16 ×16 pixels (each is comprised of luminance data of 8 ×8 pixels) and color data Cb, Cr corresponding to all pixel data of the luminance data Y00~Y11.

The macro block data of the current or present frame is directly delivered to a subtracter 9 through a motion compensation unit 8.

On the other hand, the above-mentioned macro data is compared with a predetermined reference value. A difference determined by this comparison is delivered as intraframe coded data (intra data) to a first orthogonal transform circuit 4 serving as first orthogonal transform means.

The first orthogonal transform circuit 4 is comprised of, e.g., so called a DCT (Discrete Cosine Transform circuit), and serves to orthogonally transform the intra data delivered thereto so that efficient coded data is provided to deliver it as transformed coded intra data to a transmission block setting circuit 10.

At the transmit block setting circuit 10, a threshold level of a predetermined level, for example, is set. This transmit block setting circuit 10 determines a range transmission from the transformed coded intra data on the basis of this threshold level to deliver it as transmit block patterned intra data to an inter/intra selector 12.

On the other hand, the motion compensation unit 8 is comprised of a motion compensation circuit 6 and a loop filter 7. In the motion compensating unit 8 constructed as above, to the motion compensation circuit 6, predict earlier frame data indicating data of the earlier frame data is delivered through the loop filter 7 from a predict earlier frame memory 22 which will be described later independently of the macro block data. The motion compensation circuit 6 detects a motion or movement of a picture from the macro block data of the current frame delivered and the predict earlier frame data, and implements a compensation corresponding to the detected motion to the predict earlier frame data to deliver it as predict current frame data to the subtracter 9. It is to be noted that the loop filter 7 is applied in order to prevent inconveniences of display pictures, and is turned ON, e.g., when motion compensation is carried out.

The subtracter 9 carries out a processing to subtract the predict current, frame data from the macro block data of the current frame delivered thereto to thereby generate interframe coded data (inter data) which is data indicating a detected difference between the macro block of the current, frame and macro block data of the earlier frame to deliver it, to a second orthogonal transform circuit 5 serving as second orthogonal transform means.

The second orthogonal transform circuit 5 is comprised of, e.g., a DCT (Discrete Cosine Transform circuit) similarly to the first orthogonal transform circuit 4, and serves to orthogonally transform inter data delivered thereto so that efficient coded data is provided to deliver it as transformed coded inter data to the transmit block setting circuit 11.

At the transmit block setting circuit 11, a threshold level of a predetermined level for example, is set. This transmit block setting circuit 11 determines a range of transmission from the transformed coded inter data to deliver it as transmit block patterned inter data to the inter/intra selector 12.

The inter/intra selector 12 performs operations indicated by the following equations (8) to (10) with respect to the transmit block patterned intra data and transmit block patterned inter data delivered thereto.

$$\text{Inter} - DC = | \sum_{i=0}^{3} \text{Inter}[Y(i)].\text{Coef}(0) | \qquad (8)$$

$$\text{Inter} - AC_{sum} = \sum_{i=0}^{3} \sum_{j=1}^{n} |\text{Inter}[Y(i)].\text{Coef}(j)| \qquad (9)$$

$$\text{Intra} - AC_{sum} = \sum_{i=0}^{3} \sum_{j=1}^{n} |\text{Intra}[Y(i)].\text{Coef}(j)| \qquad (10)$$

Namely, the inter/intra selector 12 first performs the operation indicated by the above equation (8) to calculate an average (DC component of inter quantized picture data) of the O-th pixel data (first pixel data within the macro block) of the transmit block patterned inter data delivered at the macro block to assume it as a luminance level of the entirety of transmit block patterned inter data delivered by the macro block. Then, the inter/intra selector 12 performs the operation indicated by the above equation (9) to calculate a cumulative or accumulated added value of absolute values of AC components which are components except for the above DC component of the transmit block patterned inter data delivered at the macro block. Then, the inter/intra selector 12 performs the operation indicated by the above equation (10) to calculate a cumulative or accumulated added value of absolute values of AC components of the transmit block patterned intra data delivered by the macro block. Then, the inter/intra selector 12 executes an algorithm as shown in FIG. 3 on the basis of values calculated by the above equations (8) to (10).

Figure 3:
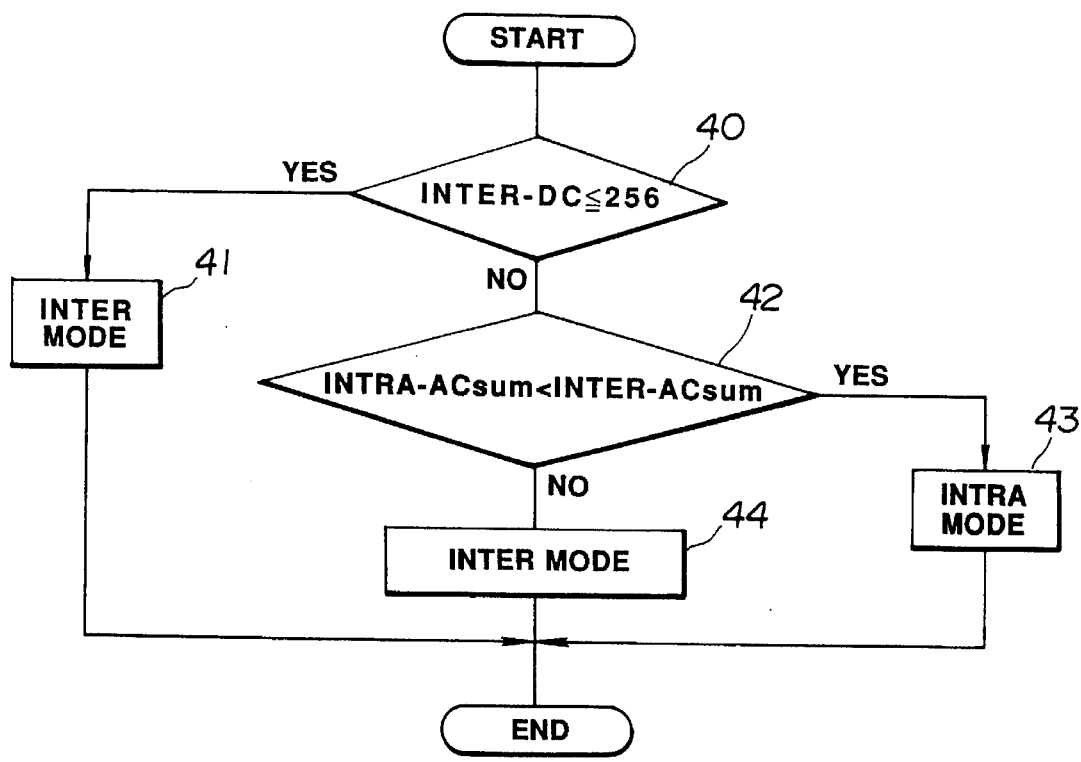
FIG. 3 is a flowchart for explaining the discriminative operation for inter/intra discrimination of the coding apparatus for video signal according to this invention.

The flowchart shown in FIG. 3 is started when the inter/intra selector 12 completes operations indicated by the above equations (8) to (10).

Then, the discriminative operation proceeds to step 40 to discriminate whether or not a DC component of the transmit block patterned inter data calculated by the above equation (8) is less than a threshold level set in advance (e.g., 256). As a result, in the case of YES, the discriminative operation proceeds to step 41. In contrast, in the case of NO, the discriminative operation proceeds to step 42. When it is discriminated at the step 40 that the DC component of the transmit block patterned inter data is less than the threshold level set in advance, there is the possibility that it is judged as a meaningless block at the transmit buffer memory 15, etc. so that a corresponding frame is dropped. For this reason, at the step 41, the inter/intra selector 12 forcedly selects the transmit block patterned inter data to output it. Thus, the discriminative operation is completed.

Then, at the step 42, a cumulative or accumulated added value of absolute values of AC components of the transmit block patterned inter data calculated by the above equation (9) and a cumulative or accumulated added value of absolute values of AC components of the transmit block patterned intra data calculated by the above equation (10) are compared with each other to discriminate whether or not, the cumulative added value of absolute values of AC components of the transmit block patterned inter data is less than the cumulative added value of absolute values of AC components of the transmit block patterned intra data. As a result, in the case of YES, the discriminative operation proceeds to step 43. In contrast, in the case of NO, the discriminative operation proceeds to step 44.

Here, the cumulative added value of absolute values of AC components of the transmit block patterned inter data and the cumulative added value of AC components of the transmit block patterned intra data substantially correspond to a quantity of codes in the case where data from the inter/intra selector 12 is subjected to retransform coding at the retransform encoder 14. For this reason, at the step 43, in the case where the cumulative added value of absolute values of AC components of the transmit block patterned inter data is above the cumulative added value of absolute values of AC components of the transmit block patterned intra data, the inter/intra selector 12 selects transmit block patterned intra data to output it. Thus, the discriminative operation is completed. In contrast, at the step 44, in the case where the cumulative added value of absolute values of AC components of the transmit block patterned intra data is above the cumulative added value of absolute values of AC components of the transmit block patterned inter data, the inter/intra selector 12 selects transmit block patterned inter data to output it. Thus, the discriminative operation is completed.

The program for carrying out such an inter/intra discrimination at the inter/intra selector 12 is as follows.

```
begin
    if Inter-DC<=256.0 then
        MacroBlockType = Inter-mode
    else
        begin
            if Inter-ACsum > Intra-ACsum then
                MacroBlockType = Intra-mode
            else
                MacroBlockType = Inter-mode
        end
end
```

As stated above, by adopting such a configuration to respectively and independently implement orthogonal transform processing to the inter data and the intra data thereafter to select transmit block patterned inter data or transmit block patterned intra data to output it, it is possible to carry out inter/intra discrimination only by determining three values of a DC component of transmit block patterned inter data, a cumulative added value of absolute values of AC components of transmit block patterned inter data, and a cumulative added value of absolute values of AC components of transmit block patterned intra data. Namely, by the above-mentioned configuration, a quantity of operations for inter/intra discrimination at the inter/intra selector 12 can be reduced.

Transmit block patterned inter data or transmit block patterned intra data selected by the inter/intra selector 12 is delivered to a quantizer 13.

The quantizer 13 quantizes the transmit block patterned intra data or transmit block patterned inter data delivered at a quantization step size corresponding to residual data delivered from the transmit buffer memory 15 to output it as intra quantized picture data or inter quantized picture data. This intra quantized picture data or inter quantized picture data is delivered to a retransform encoder 14, and is also delivered to an inverse quantizer 19.

The inverse quantizer 19 inverse quantizes the transmit block patterned inter data or the transmit block patterned intra data delivered from the quantizer 13 to respectively deliver them as inverse quantized data to an inverse orthogonal transform circuit 20. The inverse orthogonal transform circuit 20 implements, to inverse quantized data delivered thereto, an orthogonal transform opposite to that of the second orthogonal transform opposite to that of the second orthogonal transform circuit 5 to deliver it as inverse orthogonally transformed data to a decoder 21. The decoder 21 decodes the inverse orthogonally transformed data delivered thereto. Data decoded by this decoder 21 is delivered to a predict earlier frame memory 22 as coding difference data which is data indicating a difference between inter data of a current frame and inter data of an earlier frame. Predict earlier frame data stored up to that time in the predict earlier frame memory 22 is subjected to modifying operation by the coding difference data newly delivered. The predict earlier frame memory 22 stores the data subjected to modifying operation as new predict earlier frame data. The predict earlier frame data delivered to the predict earlier frame memory 22 is subjected to motion compensation by the motion compensation circuit 6 through the loop filter 7. The motion compensated data thus obtained is delivered to the subtracter 9. The subtracter 9 executes, as described above, such a processing to subtract the predict current frame data from macro block data of the current frame to generate inter data to deliver it to the second orthogonal transform circuit 5 serving as the second orthogonal transform means.

On the other hand, the retransform encoder 14 is comprised of a Variable Length Coding circuit or encoder (so called a VLC), etc. This retransform encoder 14 implements, for a second time, efficient coding processing to quantized picture data delivered to deliver it as transmit picture data to the transmit buffer memory 15.

The transmit buffer memory 15 stores the transmit picture data delivered, and reads out the stored transmit picture data at a predetermined transmission rate to deliver it to a multiplexer 16.

Here, the transmit buffer memory 15 delivers residual data indicating a residual of the memory area to the quantizer 13. The quantizer 13 carries out quantization at a quantization step corresponding to the residual data delivered. When the quantizer 13 recognizes by residual data that there is no room in the memory of the buffer memory 15, it stops the quantization operation. Thus, there results a frame dropped state. As a result, overflow, etc. in the transmit buffer memory 15 is prevented. Further, since there is adopted a configuration to carry out inter/intra discrimination after orthogonal transformation of data, it is sufficient to stop only the quantizer 13 in order to prevent overflow in the transmit buffer memory 15. For this reason, control points for preventing such overflow can be concentrated. Thus, so called controllability can be improved.

The multiplexer 16 synthesizes the transmit picture data delivered from the transmit buffer memory 15 and audio data delivered from an audio data generator 17 to output synthesized data through an output terminal 18. The synthesized data outputted through the output terminal 18 is delivered to a decoding device as shown in FIG. 4, for example, through a transmission path.

Figure 4:
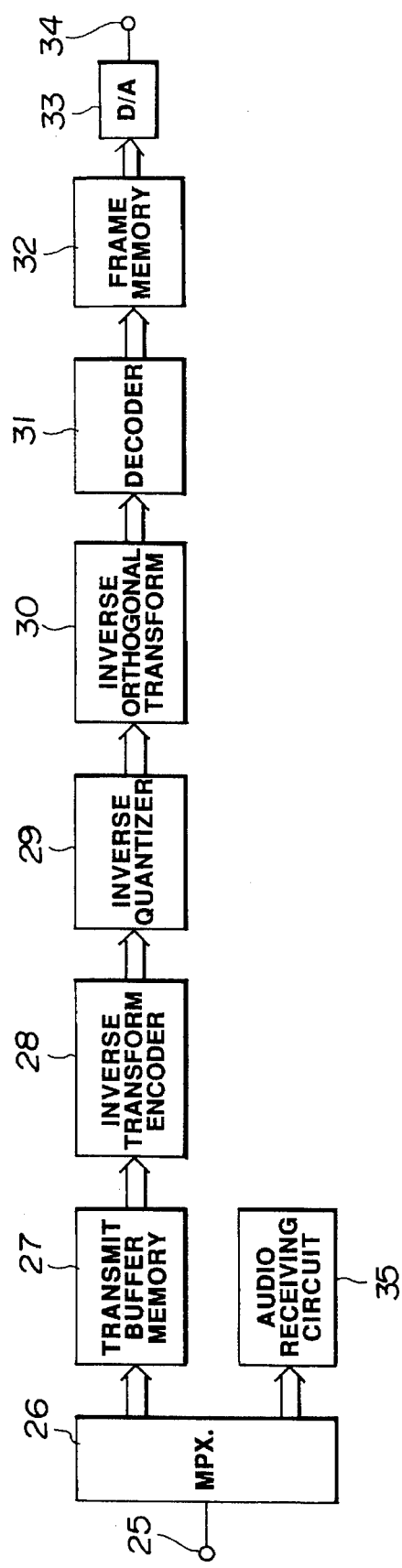
FIG. 4 is a block diagram showing an example of a decoding apparatus for decoding video data subjected to efficient coding by the video signal coding apparatus according to this invention.
Figure 5:
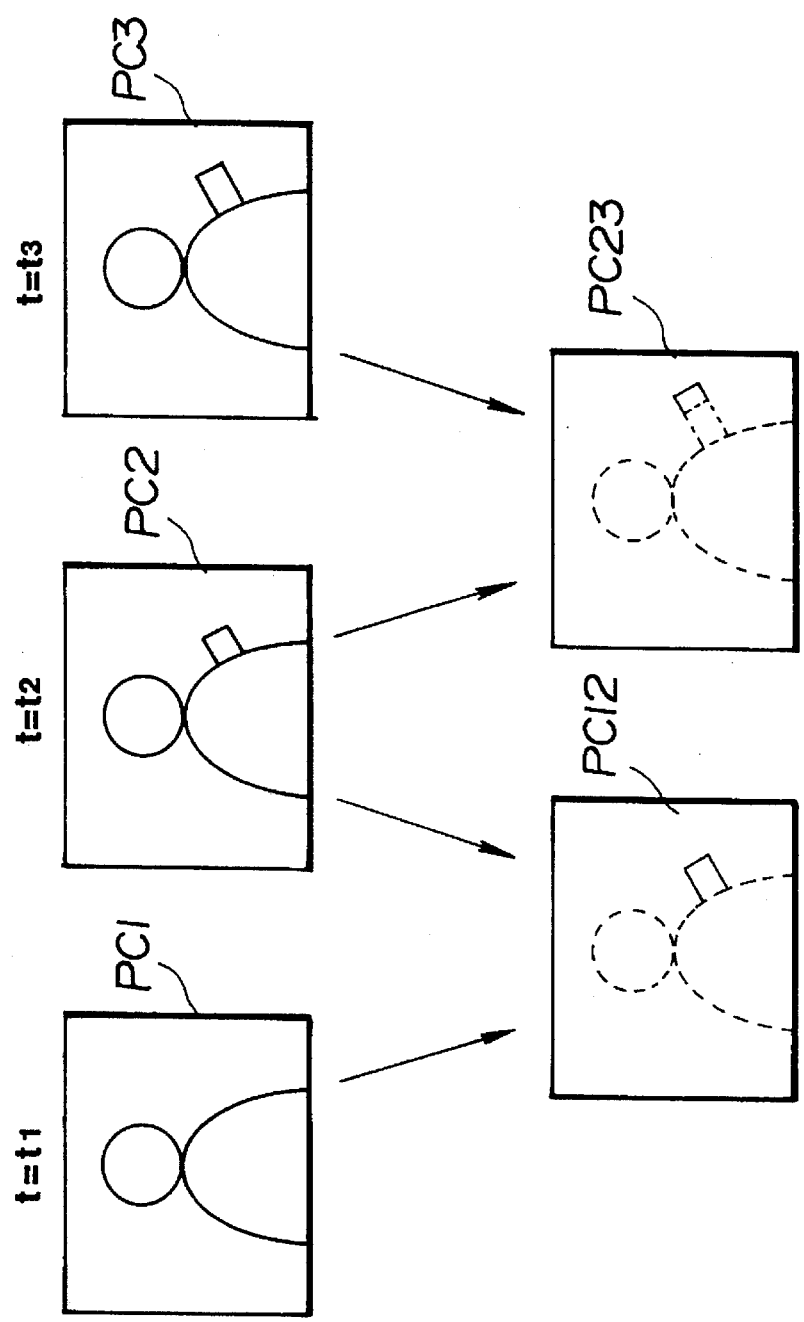
FIG. 5 is a model view for explaining inter data and intra data of the coding apparatus for video signal according to this invention.
Figure 6:
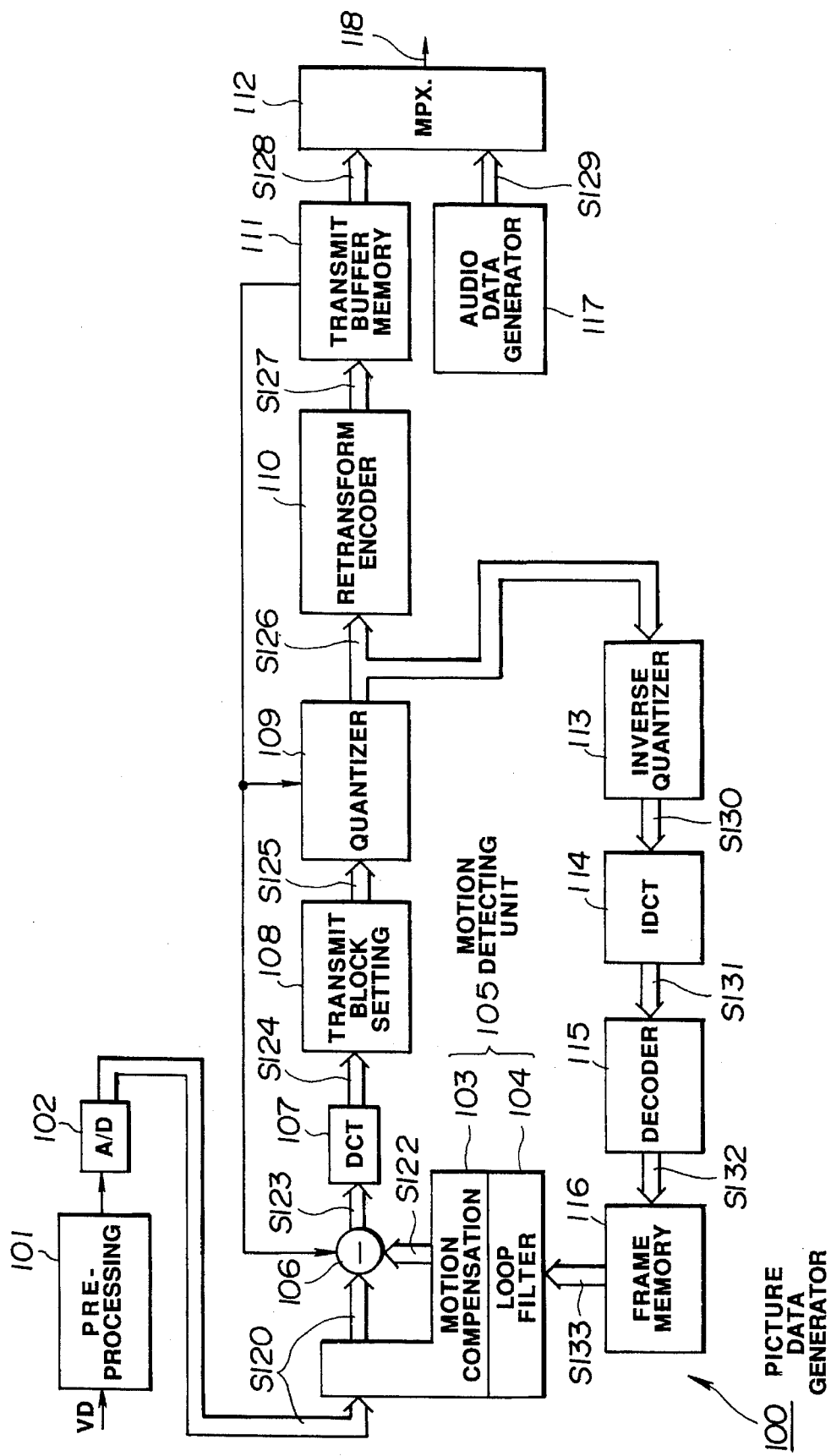
FIG. 6 is a functional block diagram of a conventional video signal coding apparatus.

In FIG. 4, the synthesized data delivered through the output terminal 18 shown in FIG. 1 and the transmission path is delivered to a multiplexer 26 through an input terminal 25. The multiplexer 26 separates the synthesized data delivered thereto into transmit picture data and audio data to deliver the transmit picture data to a transmit buffer memory 27, and to deliver audio data to an audio receiving circuit 35. The audio receiving circuit 35 demodulates audio data delivered to deliver it as an audio signal to a speaker, etc., for example. The transmit buffer memory 27 once stores and reads out transmit picture data delivered to deliver the transmit picture data thus read out to an inverse orthogonal transform encoder 28. The inverse orthogonal transform encoder 28 implements, to the transmit picture data delivered thereto, a transform coding processing opposite to that of the retransform encoder 14 to thereby transform it as inter quantized picture data or intra quantized picture data to deliver it to an inverse quantizer 29. The inverse quantizer 29 inverse-quantizes inter quantized picture data or intra quantized picture data delivered thereto to thereby transform such data to transformed coded data to deliver it to an inverse orthogonal transform circuit 30. The inverse orthogonal transform circuit 30 implements inverse orthogonal transformation to transformed coded data delivered thereto to thereby generate inter data or intra data to deliver it to a decoder 31. The decoder 31 carries out decoding processing of inter data or intra data delivered thereto to thereby such data it, to video data to deliver it to a D/A converter 33. The D/A converter 33 converts video data delivered to analog data to output it, as a video signal. The video signal thus decoded is outputted through an output terminal 34, and is delivered to a monitor device, etc., e.g., a liquid crystal display tube. Thus, a picture transmitted to the monitor device can be displayed.

As is clear from the foregoing description, the coding apparatus for video signal according to this invention adopts such a configuration to independently orthogonally transform inter data and intra data with respect to a video signal delivered thereto thereafter to select either of the intra data and the intra data at the inter/intra selector 12 to output a selected one, thereby making it possible to reduce a quantity of operations for inter/intra discrimination carried out in the inter/intra selector 12, and to reduce the number of operational circuits adapted for carrying out operation for inter/intra discrimination, or the like. For this reason, the area for installation of the operational circuits, etc. can be reduced. Thus, hardware of the video signal coding apparatus itself can be miniaturized, and the cost therefor can be reduced.

In addition, by the above circuit configuration, it is sufficient for preventing overflow of the transmit buffer memory 15 to stop only the quantizer 13. As a result, control points for preventing overflow of the transmit buffer memory 15 can be concentrated. Thus, so called a controllability can be improved.

What is claimed is:

1. A coding apparatus for coding a digital video signal having a plurality of macro blocks each having n×n pixels, comprising:

means for intraframe coding said macro blocks of said digital video signal to produce intraframe macro blocks of coded data;

means for interframe coding said macro blocks of said digital video signal to produce interframe macro blocks of coded data;

means for discrete cosine transforming (DCT) each of said intraframe macro blocks to produce transformed intraframe macro blocks of coded data, each of said transformed intraframe macro blocks including intraframe AC components;

means for discrete cosine transforming (DCT) each of said interframe macro blocks to produce transformed interframe macro blocks of coded data, each of said transformed interframe macro blocks including interframe AC components and an interframe DC component; and means for selecting said transformed interframe coded data when an accumulated sum of the absolute values of all of said intraframe AC components is greater than an accumulated sum of the absolute values of all of said interframe AC components, and for selecting said transformed intraframe coded data when said transformed interframe coded data is not selected by said means for selecting.

2. The apparatus as set forth in claim 1, wherein said means for interframe coding includes means for motion compensating said digital video signal.

3. A method of coding a digital video signal having a plurality of macro blocks each having n×n pixels, comprising the steps of:

intraframe coding said macro blocks of said digital video signal to produce intraframe macro blocks of coded data;

interframe coding said macro blocks of said digital video signal to produce interframe macro blocks of coded data;

discrete cosine transforming (DCT) each of said intraframe macro blocks to produce transformed intraframe macro blocks of coded data, each of said transformed intraframe macro blocks including intraframe AC components;

discrete cosine transforming (DCT) each of said interframe macro blocks to produce transformed interframe macro blocks of coded data, each of said transformed interframe macro blocks including interframe AC components and an interframe DC component; and selecting said transformed interframe coded data when an accumulated sum of the absolute values of all of said intraframe AC components is greater than an accumulated sum of the absolute values of all of said interframe AC components, and selecting said transformed intraframe coded data when said transformed interframe coded data is not selected.

4. The method of claim 3, wherein said step of interframe coding includes the step of motion compensation said digital video signal.

5. A coding apparatus for coding a digital video signal having a plurality of macro blocks each having n×n pixels, comprising:

means for intraframe coding said macro blocks of said digital video signal to produce intraframe macro blocks of coded data;

means for interframe coding said macro blocks of said digital video signal to produce interframe macro blocks of coded data;

means for discrete cosine transforming each of said intraframe macro blocks to produce transformed intraframe macro blocks of coded data, each of said transformed intraframe macro blocks including intraframe AC components;

means for discrete cosine transforming each of said interframe macro blocks to produce transformed interframe macro blocks of coded data, each of said transformed interframe macro blocks including interframe AC components and an interframe DC component; and means for selecting, for each macro block, said transformed interframe coded data when an accumulated sum of the absolute values of all of said intraframe AC components is greater than an accumulated sum of the absolute values of all of said interframe AC components, and for selecting said transformed intraframe coded data when said transformed interframe coded data is not selected by said means for selecting.

* * * * *